US011483706B2

(12) United States Patent
Raghunathan et al.

(10) Patent No.: US 11,483,706 B2
(45) Date of Patent: Oct. 25, 2022

(54) WIRELESS MEDIA CONFERENCING

(71) Applicant: T-Mobile Innovations LLC, Overland Park, KS (US)

(72) Inventors: Sathyanarayanan Raghunathan, Herndon, VA (US); Muthukumaraswamy Sekar, Brambleton, VA (US); Maheswaran Vijayakumar, Herndon, VA (US); Suresh Majjara, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 349 days.

(21) Appl. No.: 16/230,172

(22) Filed: Dec. 21, 2018

(65) Prior Publication Data

US 2020/0204990 A1 Jun. 25, 2020

(51) Int. Cl.
*H04L 29/06* (2006.01)
*H04W 12/06* (2021.01)
(Continued)

(52) U.S. Cl.
CPC .......... *H04W 12/06* (2013.01); *H04L 9/0894* (2013.01); *H04L 12/189* (2013.01); *H04W 12/041* (2021.01)

(58) Field of Classification Search
CPC ............ H04W 12/06; H04W 12/0401; H04W 12/189; H04L 9/0894
See application file for complete search history.

(56) References Cited

U.S. PATENT DOCUMENTS 7,627,316 B2 12/2009 Blicker
7,969,984 B2 6/2011 Bischinger et al.
(Continued)

FOREIGN PATENT DOCUMENTS

CN 107070950 A 8/2017
WO WO 2018/077438 * 10/2016 ............. H04L 29/06

OTHER PUBLICATIONS

Yi-Bing Lin, et al.; "One-Pass GPRS and IMS Authentication Procedure for UMTS"; IEEE Journal on Selected Areas in Communications; Jan. 23, 2004; pp. 1-20; Hsinchu, Taiwan, ROC.
(Continued)

*Primary Examiner* — Joseph P Hirl
*Assistant Examiner* — Chi D Nguy (57) ABSTRACT

A wireless network transfers UE information to an authorization server. The authorization server generates an expected result based on a random number and secret key in response to the UE information. The authorization server transfers the expected result and the random number to the wireless network which transfers the random number to the UE. The wireless network receives an authentication result from the UE and authenticates the UE by matching the authentication result to the expected result. In response to network authentication, the wireless network transfers the expected result to a conferencing server. The conferencing server receives the authentication result from the UE and registers the UE by matching the authentication result to the expected result. The conferencing server establishes media conferences for the UE. The wireless network exchanges media for the UE. Advantageously, the wireless network efficiently eliminates redundant authentication tasks from the authorization server and conferencing server.

20 Claims, 8 Drawing Sheets

(51) Int. Cl.
    *H04L 9/08*         (2006.01)
    *H04L 12/18*       (2006.01)
    *H04W 12/041*    (2021.01)

(56) References Cited

U.S. PATENT DOCUMENTS

| | | |
|---|---|---|
| 8,515,421 B2 | 8/2013 | Shaheen et al. |
| 8,743,887 B2 | 6/2014 | Balasubramanian et al. |
| 8,984,615 B2 | 3/2015 | Bhuyan et al. |
| 2009/0172397 A1 | 7/2009 | Kim |
| 2011/0010764 A1 | 1/2011 | Lei et al. |
| 2019/0208419 A1* | 7/2019 | Phan .................... H04L 9/3213 |
| 2020/0314924 A1* | 10/2020 | Bischinger ........ H04W 12/0609 |

OTHER PUBLICATIONS

Madhu J. Sharma, et al.; "IP Multimedia subsystem authentication protocol in LTE-heterogeneous networks"; Human-centric Computing and Information Sciences 2012; Oct. 15, 2012; pp. 1-19; vol. 2, Issue 16; Springer; Vancouver, British Columbia, Canada.

\* cited by examiner

WIRELESS MEDIA CONFERENCING

TECHNICAL BACKGROUND

Wireless communication networks serve wireless User Equipment (UE) with mobile data services like voice calling and internet access. The wireless data networks have wireless access points that exchange data and signaling over the air with the wireless UEs. The wireless access points exchange the data and signaling with wireless network cores. The wireless network cores exchange the data with the internet and voice calling servers. Popular forms of wireless networking are Fifth Generation New Radio (5GNR) and Long Term Evolution (LTE). An Internet Protocol Multimedia Subsystem (IMS) is a popular voice calling platform. The IMS exchanges Session Initiation Protocol (SIP) signaling with the UEs to collect and distribute UE addresses for voice and video calls. The calling UEs exchange their voice and video data with one another using the UE addresses.

Initially, the UE registers with an LTE network to access IMS voice and video calling. To register with the LTE network, the LIE attaches to an LTE access point and transfers an initial Non-Access Stratum (NAS) message over the LTE access point to a Mobility Management Entity (MME). The initial NAS message indicates an International Mobile Subscriber Identifier (IMSI) for the UE. The MME transfers the IMSI is for the UE to a Home Subscriber System (HSS). The HSS shares a secret key with the UE. The HSS uses the secret key to generate an authentication vector for the UE that comprises a Key Access Security Management Entry (K-ASME), Authentication Token (AUTN), Expected Result (X-RES), and Random Number (RAND). The HSS returns the authentication vector to the MME. The MME processes the K-ASME to generate a NAS Encryption Key (Ke), NAS Integrity Key (Ki), and eNodeB key (K-eNB). The MME transfers a NAS authentication request having the RAND and AUTN to the UE.

The UE generates an authentication result based on the shared secret key, AUTN, and RAND. The UE transfers a NAS authentication response having the authentication result to the MME. The MME matches the authentication result to the X-RES from the HSS to authenticate the UE. The MME then transfers a NAS security command to the UE indicating NAS encryption and integrity algorithms and a Key Selection Identifier Access Security Management Entry (KSI-ASME).

The UE selects the K-ASME based on the KSI-ASME. The UE derives the Ke based on the K-ASME and the encryption algorithm. The UE derives the Ki based on the K-ASME and the integrity algorithm. The UE returns a NAS security response to the MME using the Ke and the Ki for a secure communication. In response to the secure communication, the MME transfers an S1-MME initiation message having the K-eNB to the LTE access point. The LTE access point processes the K-eNB to generate Radio Resource Control (RRC) encryption and integrity keys. The LTE access point indicates RRC encryption and integrity algorithms to the UE.

The UE uses the K-ASME and the encryption and integrity algorithms to derive the RRC encryption and integrity keys. The UE uses the RRC encryption and integrity keys to respond to the LTE access point in a secure communication. In response to the secure communication, the LTE access point returns an S1-MME response to the MME indicating successful security establishment for the UE. The MME requests service identification for the UE from the HSS. The HSS translates the IMSI for the UE into Access Point Names (APNs) for the UE. Typical APNs are for interact access and IMS. The LTE network establishes a connection between e UE and the EMS in response to the EMS APN. The LTE network establishes a connection between the UE and the internet in response to the internet APN. LTE registration for the UE is complete.

To register for IMS services, the UE transfers a SIP registration message to the IMS over the LTE connection. The SIP registration message has an Internet Protocol Multimedia Public Identity (IMPU) and an Internet Protocol Multimedia Private Identity (IMPI). A Proxy Call State Control Function (P-CSCF) in the IMS receives the SIP registration message and transfers the SIP registration message to an Interrogating Call State Control Function (I-CSCF). The I-CSCF transfers an authentication request for the UE to the HSS. The HSS indicates the S-CSCF for the UE to the I-CSCF. The I-CSCF transfers the SIP registration message to the S-CSCF. The S-CSCF transfers the an authentication request having the IMPI for the UE to the HSS. The HSS generates an authentication vector for the UE that, comprises Ke, Ki, AUTN, X-RES, and RAND. The HSS returns the authentication vector to the S-CSCF.

The S-CSCF transfers a SIP Unauthorized message having the Ke, Ki, AUTN, and RAND to the I-CSCF. The I-CSCF transfers the SIP Unauthorized message to the P-CSCF. The P-CSCF transfers the SIP Unauthorized message having only the AUTN and RAND to the UE. The UE shares the secret key with the HSS and uses the key to calculate the AUTN and authorize the P-CSCF. In response, the UE generates a registration result based on the secret key, AUTN, and RAND. The UE transfers a SIP Registration message with the IMPI, IMPU, and registration result to the P-CSCF. The P-CSCF forwards the SIP Registration message to the I-CSCF. The I-CSCF transfers an authentication request to the HSS which indicates the S-CSCF. The I-CSCF transfers the SIP Registration message with the registration result to the S-CSCF. The S-CSCF matches the registration result from the UE and the X-RES from the HSS to register the UE for IMS service.

The S-CSCF transfers a SIP OK message for the UE to the I-CSCF. The I-CSCF transfers the SIP OK message to the P-CSCF. The P-CSCF transfers the SIP OK message to the UE to complete EMS registration. The UE may now exchange SIP messaging with the IMS and exchange voice and video data with other UEs over the LIE network and other networks. Unfortunately, IMS registration requires the HSS to serve both the MME and the CSCFs for the same UE attachment. Moreover, the IMS registration does not effectively integrate 4G LTE/5GNR access points and 4G/5G network cores.

TECHNICAL OVERVIEW

A wireless network transfers UE information to a user authorization server. The user authorization server generates an expected result based on a random number and a secret key in response to the UE information. The user authorization server transfers the expected result and the random number to the wireless network which transfers the random number to the UE. The wireless network receives an authentication result from the UE and authenticates the UE by matching the authentication result to the expected result. In response to the wireless network authentication, the wireless network transfers the expected result to a media conferencing server. The media conferencing server receives the authentication result from the UE and registers the UE by matching the authentication result to the expected result. The media conferencing server establishes media conferences for the registered UE. The wireless network exchanges media conferencing data for the UE. The wireless network may be a Long Term Evolution (LTE) network and/or a Fifth Generation New Radio (5GNR) network. The media conferencing server could be an Internet Multimedia Subsystem (IMS). Advantageously, the wireless network efficiently eliminates redundant authentication tasks from the authorization server and conferencing server.

DETAILED DESCRIPTION

Figure 1:
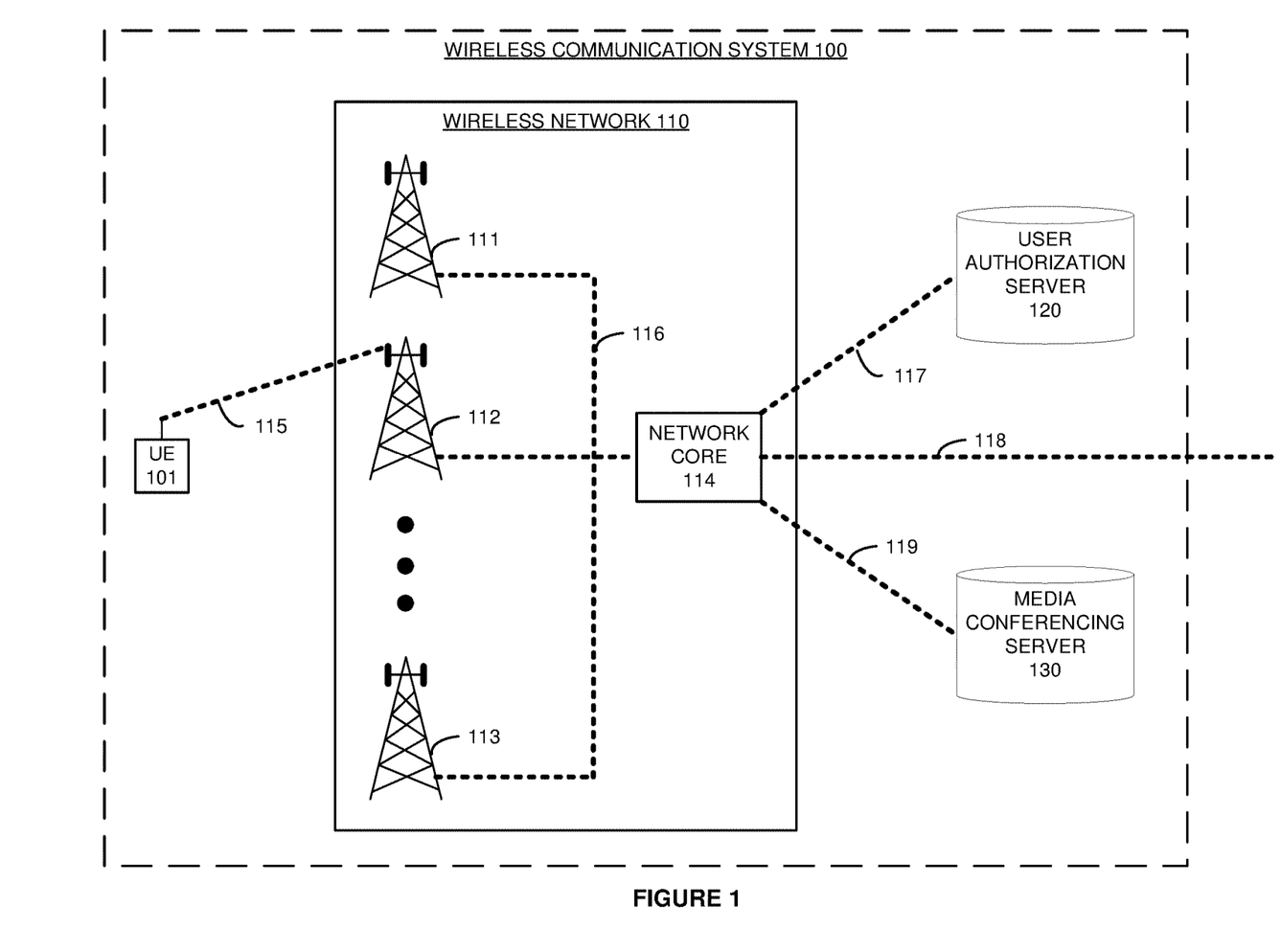
FIG. 1 illustrates a wireless communication system that serves User Equipment (UE) with media conferencing.

FIG. 1 illustrates wireless communication system 100 that serves User Equipment (UE) 101 with media conferencing. Wireless communication system 100 comprises UE 101, wireless network 110, user authorization server 120, and media conferencing server 130. UE 101 and user authentication server 120 share and store a secret key. Wireless network 110 comprises wireless access points 111-113, network core 114, and data links 115-119. In some examples, user authorization server 120 and/or media conferencing server 130 are integrated within network core 114 of wireless network 110.

UE 101 could be a computer, phone, display, headset, or some other user apparatus that uses Long Term Evolution (LTE), Fifth Generation New Radio (5GNR), Institute of Electrical and Electronic Engineers 802.11 (WIFI), or some other wireless network protocol. UE 101 comprises radio circuitry and baseband circuitry. The radio circuitry comprises antennas, modulators, amplifiers, filters, digital/analog interfaces, processing circuitry, memory circuitry, firmware/software, and bus circuitry. The baseband circuitry comprises processing circuitry, memory circuitry, bus circuitry, and software. In the baseband circuitry, the processing circuitry executes operating systems, user applications, and network applications that are stored in the memory circuitry. UE 101 stores the shared secret key.

Wireless access points 111-113 could be LTE eNodeBs, 5GNR gNodeBs, WIFI hotspots, and/or the like. Wireless access points 111-113 comprise radio circuitry and baseband circuitry. The radio circuitry comprises antennas, modulators, amplifiers, filters, digital/analog interfaces, processing circuitry, memory circuitry, firmware/software, and bus circuitry. The baseband circuitry comprises processing circuitry, memory circuitry, bus circuitry, software, and transceivers. In the baseband circuitry, the processing circuitry executes operating systems and network applications that are stored in the memory circuitry.

Network core 114 could be an LTE core, 5G core, and/or some other type of network data center. Network core 114 comprises LTE and 5G network elements like Mobility Management Entity (MME), Home Subscriber System (HSS), Serving Gateway (S-GW), Packet Data Network Gateway (P-GW), Policy Control Rules Function (PCRF), Access and Mobility Management Function (AMFs, Authentication Server Function (AUSF), Unified Data Management (UDM), Session Management Function (SMF), User Plane Function (UPF), Policy Control Functions (PCF), Application Functions (AF), Network Repository Function (NRF), Network Slice Selection Function (NSSF), Network Exposure Function (NEF), and typically other network functions. Network core 114 comprises processing circuitry, memory circuitry, bus circuitry, transceivers and software. The processing circuitry executes operating systems and the network element software that are stored in the memory circuitry.

User authorization server 120 comprises processing circuitry, memory circuitry, bus circuitry, transceivers and software. The processing circuitry executes operating systems and authorization software that are stored in the memory circuitry. User authorization server 120 hosts a data structure that associates UE information with media conferencing registration instructions—including instructions to transfer registration keys to media conferencing server 130. The data structure stores the secret key for UE 101. User authorization server 120 may comprise an HSS, AUSF, UDM, and/or some other authorization database.

Media conferencing server 130 comprises processing circuitry, memory circuitry, bus circuitry, transceivers and software. The processing circuitry executes operating systems and media conferencing software that are stored in the memory circuitry. Media conferencing server 130 may comprise Internet Protocol Multimedia Subsystem (IMS) servers and/or some other media call processors. Advantageously, media conferencing server 130 registers UE 101 based on an expected result that was generated by user authorization server 120 and forwarded by network core 114.

In operation, UE 101 wirelessly transfers attachment signaling including UE information to wireless access point 112 over wireless link 115. The UE information could be an International Mobile Subscriber Identifier (IMSI), International Mobile Equipment Identifier (IMEI), Internet Protocol Multimedia Public Identity (IMPU), Internet Protocol Multimedia. Private Identity (IMPI), or some other user identification code. Wireless access point 112 transfers the UE information to network core 114 over backhaul link 116. Network core 114 transfers the UE information to user authorization server 120 over core link 117.

User authorization server 120 generates an expected result for UE 101 based on the shared secret key and a random number. User authorization server 120 transfers the expected result and the random number for UE 101 to wireless network 110 over link 117. Wireless network 110 transfers the random number to UE 101. UE 101 processes the random number and the secret key to generate and return an authentication result to wireless network 110. Wireless network 110 matches the authentication result to the expected result to authenticate UE 101. In response to network authentication, wireless network 110 transfers the expected result and at least some UE information for UE 101 to media conferencing server 130 over link 119. In response to the network authentication, wireless network 110 also establishes a signaling link between UE 101 and media conferencing server 130.

To register with media conferencing server 130, UE 101 recover the authentication result from memory or processes the random number and its secret key to re-generate the authentication result. UE 101 transfers the authentication result to media conferencing server 130 over the signaling link. Media conferencing server 130 matches the authentication result from UE 101 to the expected result from user authorization server 120 to register UE 101 for media conferencing. In response to the media conferencing registration, media conferencing server 130 establishes media conferences for UE 101. Wireless network 110 exchanges media data for UE 101 like voice and video. Advantageously, wireless communication system 100 registers UE 101 for media conferencing with minimized access to user authorization server 120 and media conferencing server 130.

Figure 2:
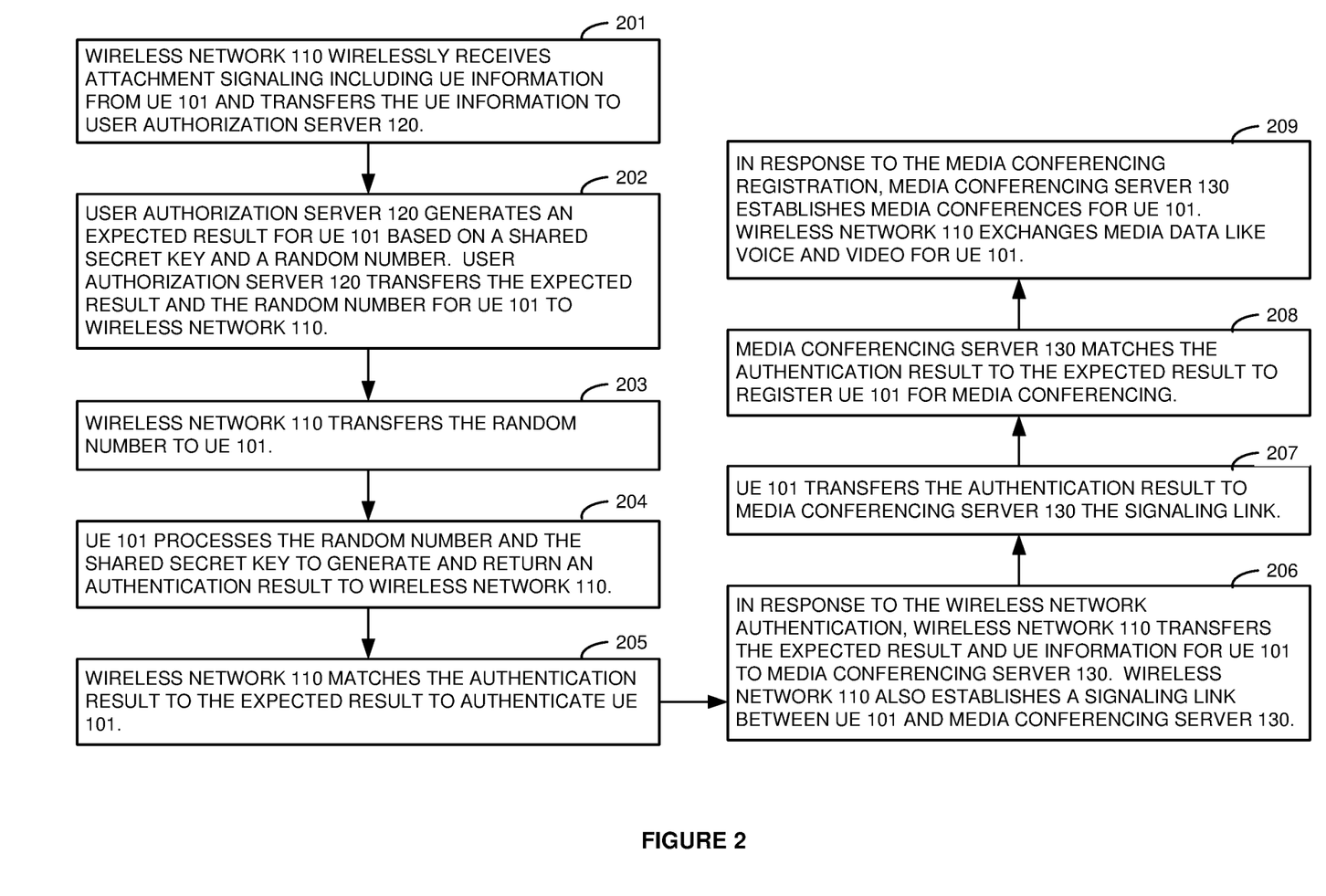
FIG. 2 illustrates the operation of the wireless communication system to serve the UE with media conferencing.

FIG. 2 illustrates the operation of wireless communication system 100 to serve UE 101 with media conferencing. Wireless network 110 wirelessly receives attachment signaling including UE information from UE 101 and transfers the UE information to user authorization server 120 (201). User authorization server 120 generates an expected result for UE 101 based on a shared secret key and a random number (202). User authorization server 120 transfers the expected result and the random number for UE 101 to wireless network 110. Wireless network 110 transfers the random number to UE 101 (203). UE 101 processes the random number and the shared secret key to generate and return an authentication result to wireless network 110 (204). Wireless network 110 matches the authentication result to the expected result to authenticate UE 101 (205).

In response to the wireless network authorization (205), wireless network 110 transfers the expected result and some UE information for UE 101 to media conferencing server 130 (206). Wireless network 110 also establishes a signaling link between UE 101 and media conferencing server 130. UE 101 transfers the authentication result to media conferencing server 130 over the signaling link (207). Media conferencing server 130 matches the authentication result to the expected result to register UE 101 for media conferencing (208). In response to the media conferencing registration, media conferencing server 130 establishes media conferences for UE 101, and wireless network 110 exchanges media data like voice and video for UE 101 (209). Advantageously, wireless communication system 100 registers UE 101 for media conferencing with minimized access to user authorization server 120 and media conferencing server 130.

Figure 3:
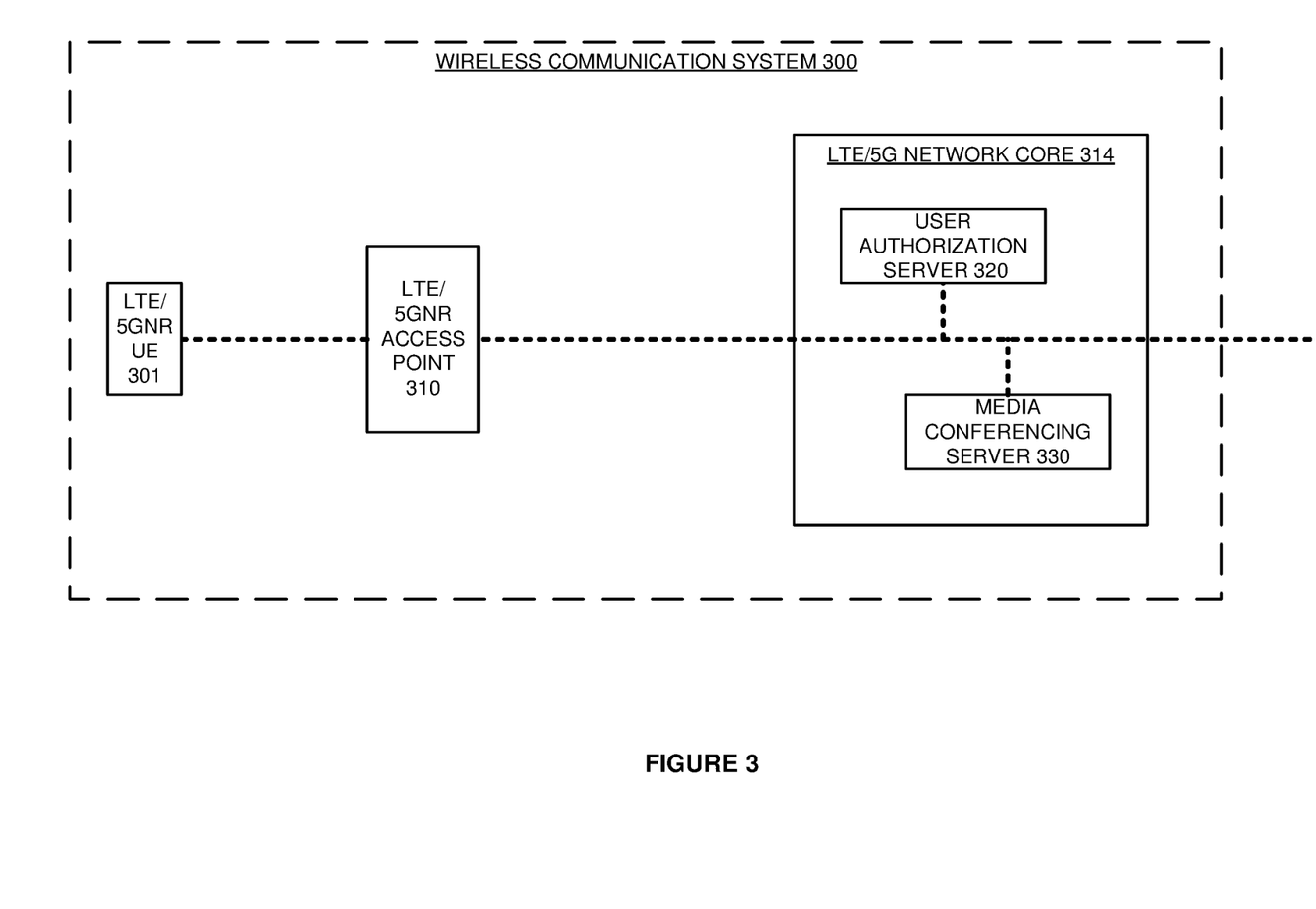
FIG. 3 illustrates a wireless communication system that serves a Long Term Evolution (LTE) and Fifth Generation New Radio (5GNR) UE with media conferencing.

FIG. 3 illustrates wireless communication system 300 that serves Long Term Evolution (LTE)/Fifth Generation New Radio (5GNR) UE 301 with media conferencing. Wireless communication system 300 is an example of wireless communication system 100 although system 100 may differ. Wireless communication system 300 comprises LTE/5GNR UE 301, LTE/5GNR access point 310, and LTE/5G network core 314. LTE/5G network core 314 comprises user authorization server 320 and media conferencing server 330. LTE/5GNR UE 301 and user authorization server 320 each store a shared a secret key.

LTE/5GNR UE 301 wirelessly transfers UE information to LTE/5GNR access point 310 during attachment. The UE information could be IMSI, IMEI, IMPU, IMPI, or some other identification codes. LTE/5GNR access point 310 transfers the UE information to LTE/5G network core 314. LTE/5G network core 314 transfers the UE information to user authorization server 320. User authorization server 320 generates an Expected Result (X-RES) for UE 301 based on the shared secret key and a Random Number (RAND). User authorization server 320 transfers the X-RES and RAND for UE 301 to LTE/5G network core 314. LTE/5G network core 314 transfers the RAND to UE 301 over LTE/5G access point 310.

UE 301 processes the RAND and the secret key to generate and return an authentication result to LTE/5G network core 314 over LTE/5G network access point 310. LTE/5G network core 314 matches the authentication result to the X-RES to authenticate UE 301. In response to LTE/5GNR network authentication, LTE/5G network core 314 transfers the expected result and the IMSI, IMEI, IMPU, and/or IMPI for UE 301 to media conferencing server 330. LTE/5G network core 314 and LTE/5G access point 310 also establishes a signaling link between UE 301 and media conferencing server 330.

UE 301 may recover the authentication result from memory or process the RAND and the secret key to regenerate the authentication result. UE 301 transfers the authentication result to media conferencing server 330 over the signaling link. Media conferencing server 330 matches the authentication result to the X-RES to register UE 301. In response to the media conferencing registration, media conferencing server 330 exchanges SIP signaling to establish media conferences for UE 301. LTE/5G access point 310 and LTE/5G network core 314 exchange media data for UE 301. Advantageously, LTE/5G network core 314 registers LTE/5GNR UE 301 for media conferencing with minimized access to user authorization server 320 and media conferencing server 330.

Figure 4:
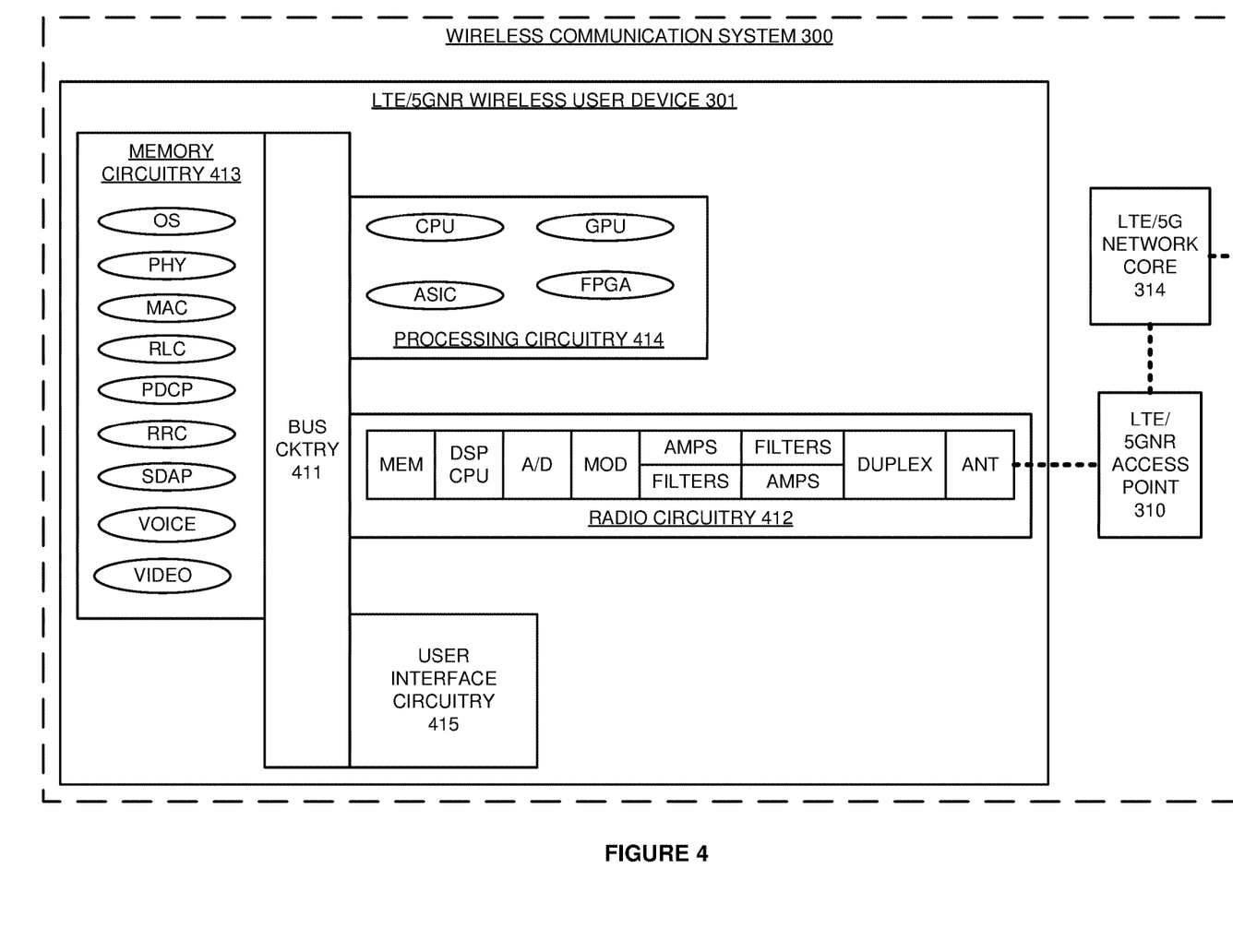
FIG. 4 illustrates the LTE/5GNR UE that receives media conferencing from the wireless communication system.

FIG. 4 illustrates LTE/5GNR UE 301 that receives media conferencing from wireless communication system 300. LTE/5GNR UE 301 is an example of UE 101 although UE 101 may differ. Wireless user device 301 comprises bus circuitry 411, radio circuitry 412, memory circuitry 413, processing circuitry 414, and user interface circuitry 415. Bus circuitry 411 couples radio circuitry 412, memory circuitry 413, processing circuitry 414, and user interface circuitry 415. Memory circuitry 413 comprises volatile and non-volatile memories like flash, disc, tape, and the like. Memory circuitry 413 stores operating systems, network applications, user applications, and the shared secret key. Processing circuitry 414 comprises CPUs, GPUs, ASICs, FPGAs and/or some other computer hardware. Processing circuitry 414 executes the operating systems, network applications, and user applications to drive radio circuitry 412 and user interface circuitry 415. User interface circuitry 415 comprises displays, speakers, microphones, transceivers, ports, and/or some other user component.

Radio circuitry 412 comprises antennas (ANT), duplexers (DUPLEX), filters, amplifiers (AMPS), modulators (MOD), analog/digital interfaces (A/D), Digital Signal Processors (DSP), Central Processing Units (CPU), and memory (MEM). The antennas in radio circuitry 412 exchange wireless data and signaling with LTE/5GNR access point 310. The DSP/CPUs execute firmware/software to drive the exchange of the data and signaling between the antennas and the radio memory. Processing circuitry 414 executes the operating systems and network applications to drive the exchange of data and signaling between the radio memory and memory circuitry 413.

The CPUs execute the voice application to drive the exchange of SIP signaling and voice data between memory circuitry 413 and radio circuitry 412. The voice application also drives the exchange of the voice data with user interface circuitry 415. User interface circuitry 415 exchanges voice information and user signaling with the user. The CPUs execute the video application to drive the exchange of SIP signaling and video data between memory circuitry 413 and radio circuitry 412. The video application also drives the exchange of the video data with user interface circuitry 415. User interface circuitry 415 exchanges video information and user signaling with the user.

The voice and video applications generate UL voice/video data and SIP signaling. The network applications transfer UL data and signaling from memory circuitry 513 to the radio memory. In radio circuitry 412, the DSP/CPUs process the UL data and signaling and transfer corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to LTE/5GNR access point 310.

In radio circuitry 412, the antennas receive wireless Downlink (DL) signals from LTE/5GNR access point 310 and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSP/CPUs. The DSP/CPUs recover DL data and signaling from the DL signals. The DSP/CPUs store the DL data and signaling in the radio memory. Processing circuitry 414 transfers the recovered DL data and signaling to memory circuitry 413. The network applications process the DL data and signaling in memory circuitry 413. The voice and video applications process the DL voice/video data and SIP signaling.

The network applications comprise Physical Layer (PHY), Media Access Control (MAC), Radio Link Control (RLC), Packet Data Convergence Protocol (PDCP), Radio Resource Control (RRC), Service Data Application Protocol (SDAP), and the like. The PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

The MAC maps between the MAC transport channels and MAC logical channels. MAC functions include buffer status, power headroom, channel quality, Hybrid Automatic Repeat Request (HARQ), user identification, random access, user scheduling, and Quality-of-Service (QoS). The RLC maps between the MAC logical channels and Protocol Data Units (PDUs). RLC functions comprise ARQ, sequence numbering and resequencing, segmentation and resegmentation. The RLC exchanges data and signaling with the PDCP. The PDCP maps between the PDUs from the RLC and Service Data Units (SDUs) for the RRC/SDAP. PDCP functions comprise security ciphering, header compression and decompression, sequence numbering and re-sequencing, de-duplication. The PDCP exchange SDUs with the RRC and SDAP.

The RRC transfers UE information like IMSI, IMEI, IMPU, and/or IMPI during RRC attachment. The RRC receives and processes a random number and the secret key to generate and return an authentication result for LTE network authentication. The RRC transfers the authentication result to the voice/video applications for IMS registration. The voice/video applications and the RRC also exchange the UE information like IMSI, IMEI, IMPU, and/or IMPI.

The RRC interacts with wireless network controllers like Access and Mobility Functions (AMFs) and/or Mobility Management Entities (MMEs) to establish and terminate data sessions. The RRC supports N1 and Non-Access Stratum (NAS) messaging with the MMEs/AMFs. The RRC handles security and key management, handover operations, status reporting, QoS, system broadcasts, and network pages. The SDAP exchanges S3 data with User Plane Functions (UPFs) under the control of Session Management Functions (SMFs). The SDAP maps between the SDUs and the QoS flows and mark the QoS flows with the proper QoS.

The voice/video applications transfer the authentication result and UE information to media conferencing server 330 in SIP registration messages. Once registered, the voice/video applications exchange SIP signaling with media conferencing server 330 to establish media conferences. LTE/5G access point 310 and LTE/5G network core 314 exchange media data for UE 301 to support the media conferences. Advantageously, UE 301 registers for media conferencing with minimized access to user authorization server 320 and media conferencing server 330.

Figure 5:
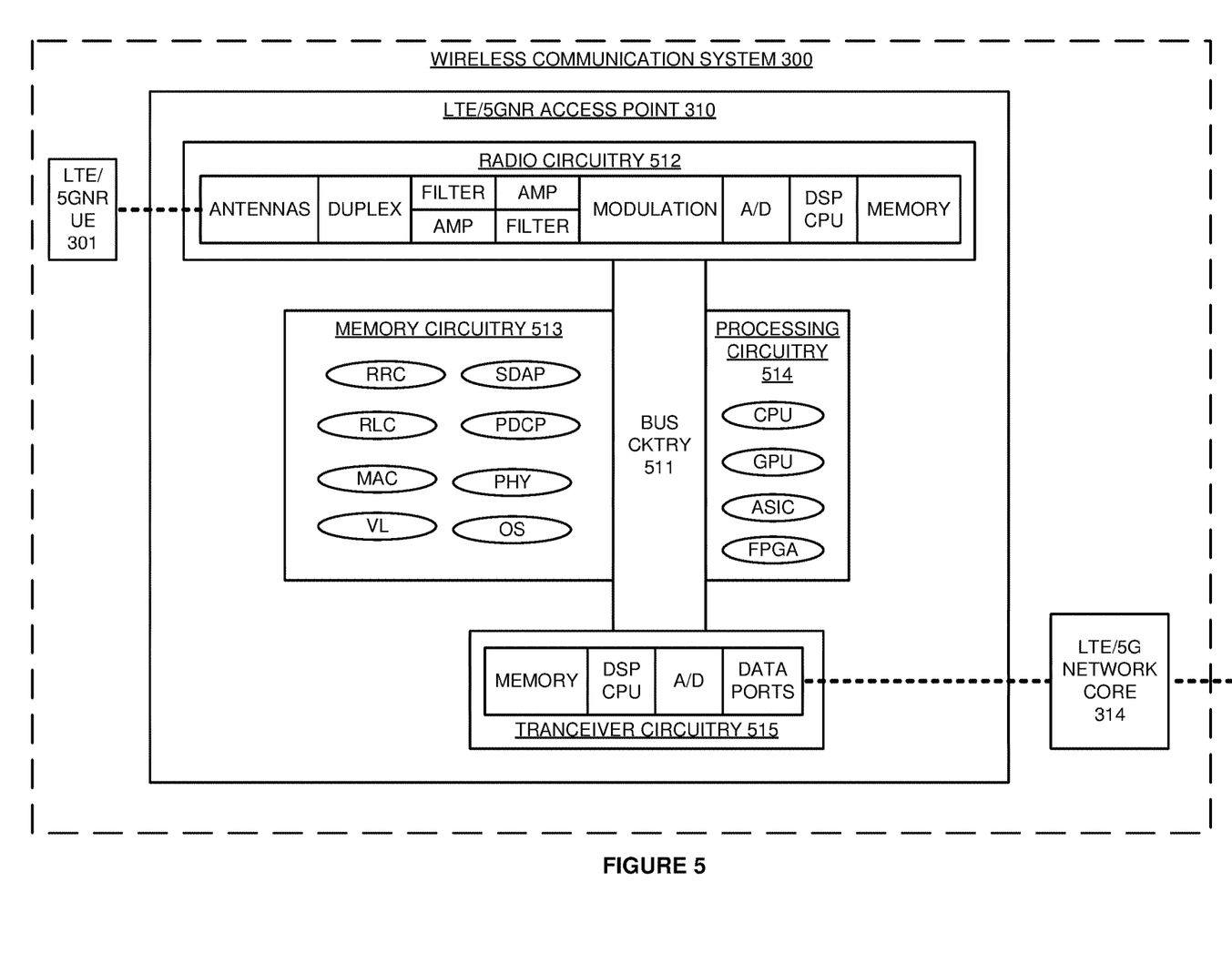
FIG. 5 illustrates an LTE/5GNR wireless access point that serves the LTE/5GNR UE with media conferencing.

FIG. 5 illustrates LTE/5GNR access point 310 that serves LTE/5GNR UE 301 with media conferencing. LTE/5GNR access point 310 is an example of wireless access points 111-113, although access points 111-113 may differ. LTE/5GNR access point 310 comprises bus circuitry 511, radio circuitry 512, memory circuitry 513, processing circuitry 514, and transceiver circuitry 515. Bus circuitry 511 couples radio circuitry 512, memory circuitry 513, processing circuitry 514, and transceiver circuitry 515. Memory circuitry 513 comprises volatile and non-volatile memories like flash, disc, tape, and the like. Memory circuitry 513 stores operating systems (OS), virtual layer (VL), network applications (PHY, MAC, RLC, PDCP, RRC, SDAP), and the like. Processing circuitry 514 comprises CPUs, GPUs, ASICs, FPGAs, or some other computer hardware. Transceiver circuitry 515 comprises memory, DSP/CPU, analog-to-digital interface, and data ports. The data ports in transceiver circuitry 515 communicate with LTE/5G network core 314.

Radio circuitry 512 comprises antennas, duplexers, filters, amplifiers, modulation, analog/digital interfaces, DSP/CPUs, and memory. The antennas exchange wireless signals with wireless LTE/5GNR UE 301. The DSP/CPUs execute firmware/software to drive the exchange of data between the antennas and the radio memory. Processing circuitry 514 drives the exchange of data between the radio memory and memory circuitry 513. Processing circuitry 514 executes the operating systems and network applications to drive the exchange of the data between memory circuitry 513 and transceiver circuitry 515. Transceiver circuitry 515 exchanges the data with network core 314.

The antennas in radio circuitry 512 receive wireless UL signals from LTE/5GNR UE 301 and transfer corresponding electrical UL signals through the duplexers to the amplifiers. The amplifiers boost the UL signals for filters which attenuate unwanted energy. In modulation, demodulators down-convert the UL signals from their carrier frequencies. The analog/digital interfaces convert the analog UL signals into digital UL signals for the DSP/CPUs. The DSP/CPUs recover UL data and signaling from the UL signals. The DSP/CPUs store the UL data and signaling in the memory. The DSP/CPUs transfer the recovered UL data and signaling to memory circuitry 513. The network applications process the UL data and signaling in memory circuitry 513. Transceiver circuitry 515 transfers the UL data and signaling to LTE/5GNR core network 314.

Transceiver circuitry 515 receives DL data and signaling from LTE/5G network core 314 and stores the DL data and signaling in memory circuitry 513. The network applications transfer the DL data and signaling from memory circuitry 513 to radio circuitry 512. In radio circuitry 512, the memory receives the DL data and signaling from memory circuitry 513. The DSP/CPUs transfer corresponding DL signals to the analog/digital interface. The analog/digital interface converts the digital DL signals into analog DL signals for the modulators. The modulators up-convert the DL signals to their carrier frequencies. The amplifiers boost the DL signals for the filters which attenuate unwanted out-of-band energy. The filters transfer the DL signals through the duplexers to the antennas. The electrical DL signals drive the antennas to emit corresponding wireless DL signals to LTE/5GNR UE 301.

In LTE/5GNR access point 310, the network applications drive the exchange of data and signaling between UE 301 and network core 314. The PHYs map between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

The MACs map between the MAC transport channels and MAC logical channels. MAC functions include buffer status, power headroom, channel quality, HARQ, user identification, random access, user scheduling, and QoS. The RLCs map between the MAC logical channels and PDUs. RLC functions comprise ARQ, sequence numbering and resequencing, segmentation and resegmentation. The RLCs exchange data and signaling with the PDCPs. The PDCPs map between the PDUs from the RLCs and SDUs for the RRCs/SDAPs. PDCP functions comprise security ciphering, header compression and decompression, sequence numbering and re-sequencing, de-duplication. The PDCPs exchange SDUs with the RRCs and SDAPs.

The RRCs interact with wireless network controllers like AMFs and/or MMEs to establish and terminate data sessions. The RRCs support N1/N2 messaging with the AMFs. The RRCs handle security and key management, handover operations, status reporting, QoS, system broadcasts, and network pages. The SDAPs exchange S3 data with UPFs under the control of SMFs. The SDAPs map between the SDUs and the QoS flows and mark the QoS flows with the proper QoS.

LTE/5GNR access point 310 is depicted as an integrated system for clarity, but 5GNR access point 310 may be distributed across Distributed Units (DUs) and Common Units (CUs). The connections between the DUs and the CUs are fronthaul circuits, and the connections between the CUs and LTE/5GNR network core 314 are backhaul circuits. In some examples, the DUs host radio circuitry 512, the CUs host circuitry 511 and 513-515, and the fronthaul circuits comprise Common Public Radio Interface (CPRI) links. In other examples, the DUs host radio circuitry 512 and the DUs/CUs each have a portion of circuitry 511 and 513-515. In these distributed circuitry examples, the DUs typically execute the PHYs and the CUs typically execute the RRCs/SDAPs. The DUs or CUs execute the MACs, RLCs, and PDCPs depending on the network application split.

The RRC in LTE/5GNR access point 310 receives UE information like IMSI, IMEI, IMPU and IMPI during RRC attachment. The RRC transfers the UE information to LTE/5G network core 314. The RRC in LTE/5GNR access point 310 transfers the random number to UE 301 and receives the authentication result from UE 301. The RRC transfers the authentication result to LTE/5G network core 314. LTE/5G access point 310 exchanges SIP signaling between UE 301 and media conferencing server 330 to support a signaling link. LTE/5G access point 310 exchanges media data for UE 301 to support media conferences.

Figure 6:
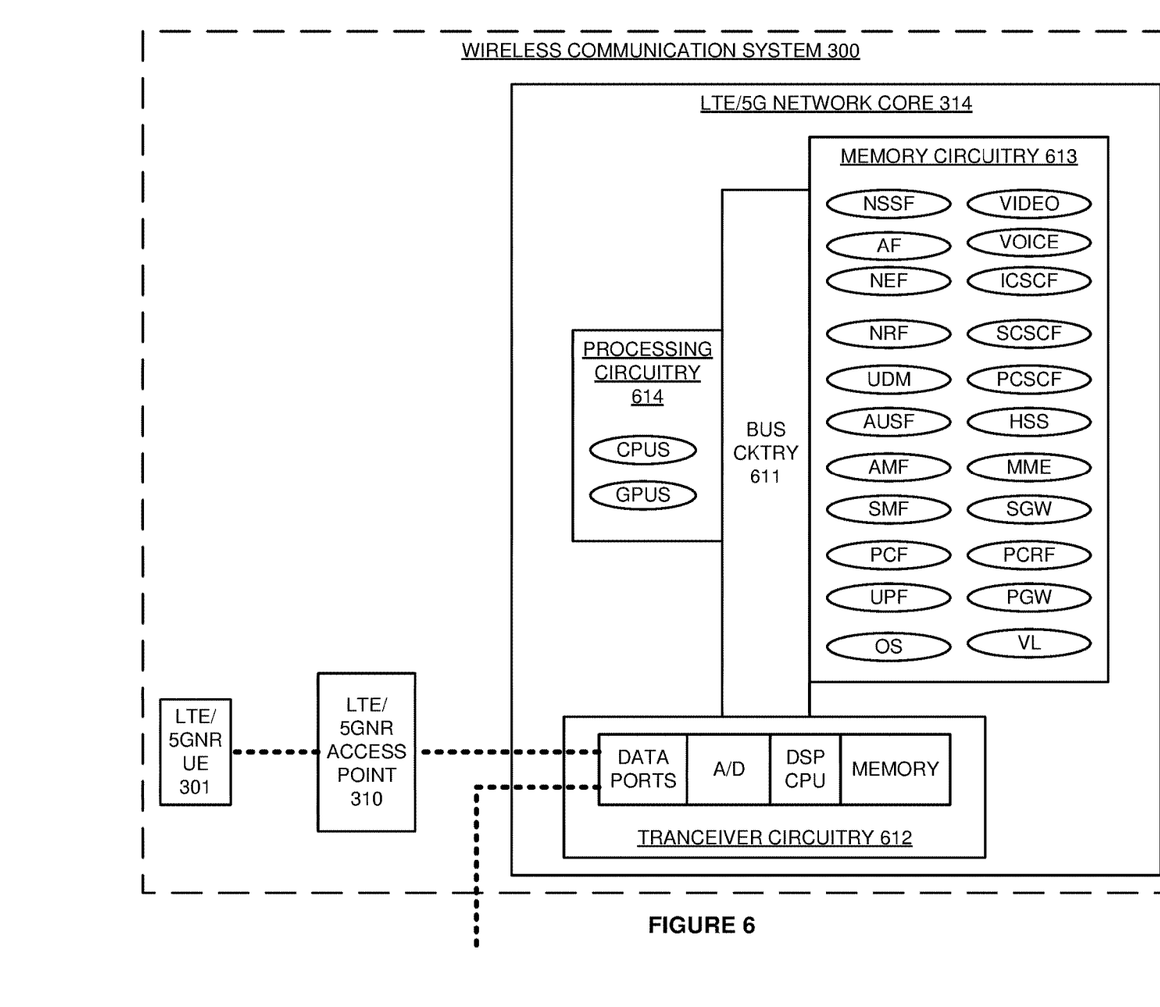
FIG. 6 illustrates an LTE/5GNR network core that serves the LTE/5GNR UE with media conferencing.

FIG. 6 illustrates 5G network core 314 that serves 5GNR UE 301 with media conferencing. 5G network core 314 is an example of network core 114 although core 114 may differ. 5G network core 314 comprises bus circuitry 611, transceiver circuitry 612, memory circuitry 613, and processing circuitry 614. Bus circuitry 611 couples transceiver circuitry 612, memory circuitry 613, and processing circuitry 614. Memory circuitry 613 comprises volatile and non-volatile memories like flash, disc, tape, and the like. Memory circuitry 613 stores operating systems, virtual layers, and network element applications. Processing circuitry 614 comprises CPUs, GPUs, and/or some other computer hardware. Processing circuitry 614 executes the operating systems, virtual layers, and network element applications. Transceiver circuitry 615 comprises memory, DSP, CPU, analog-to-digital interface, and data ports. The data ports in transceiver circuitry 615 communicate with LTE/5GNR access point 310 and with external systems like the internet.

Processing circuitry 613 executes the operating systems to drive the hardware and support the virtual layers. Processing circuitry 613 executes the virtual layers to support the network element applications. The virtual layers comprise virtual switches, virtual machines, hypervisors, and the like. In transceiver circuitry 612, the DSP/CPUs exchange data and signaling with the transceiver memory. Processing circuitry 613 exchanges the data and signaling between the transceiver memory and memory circuitry 613. Processing circuitry 614 executes the network element applications to process the data and signaling in memory circuitry 613.

The network element applications drive the exchange of data and signaling between the external systems and LTE/5GNR access point 310. The network element applications comprise: User Plane Function (UPF), Access and Mobility Management Function (AMF), Session Management Function (SMF), Authentication Server Function (AUSF), Policy Control Function (PCF), Unified Data Management (UDM), Application Function (AF), Network Repository Function (NRF), Network Slice Selection Function (NSSF), Network Exposure Function (NEF), Mobility Management Entity (MME), Home Subscriber System (HSS), Serving Gateway (S-GW), Packet Data Network Gateway (P-GW), Policy Control Rules Function (PCRF), Proxy Call State Control Function (P-CSCF), Serving Call State Control Function (S-CSCF), Interrogating Call State Control Function (I-CSCF), voice calling server (VOICE), video calling server (VIDEO), and typically other network functions.

The UPF routes data packets and forms an anchor point for user mobility. The UPF inspects packets and applies Quality-of-Service. The AMF manages authentication, authorization, connections, mobility, N1 signaling, ciphering, registration, and security. The SMF manages session establishment, modification, and release. The SMF handles network addressing, Dynamic Host Control Protocol (DHCP), N1 signaling, downlink notification, and traffic steering. The AUSF authenticates and authorizes users. The UDM generates user authentication credentials and supports user identification, authorization, and subscriptions. The PCF provides policy rules and decisions. The AF routes traffic and implements policy controls. The NRF enables service discovery and maintain network function profiles/instances. The NSSF selects network slices to serve users and determine slice assistance information and AMFs. The NEF exposes capabilities and events. The NEF securely interacts with external applications and translates internal/external information.

The MME manages session establishment, modification, and release. The MME also manages authentication, authorization, mobility. Non-Access Stratum signaling, ciphering, registration, and security. The HSS authenticates and authorizes users and indicates user services. The HSS also generates user authentication credentials and supports user identification and authorization. The S-GW serves wireless access points, routes data packets, and applies Quality-of-Service (QoS). The P-GW routes data packets, handles network addressing, DHCP, forms anchor points for user mobility, inspects packets, and applies QoS. The PCRF provides policy rules and decisions.

The P-CSCF comprises a Session Initiation Protocol (SIP) prosy that uses a session border controller to process signaling. The P-CSCF authenticates UEs, implements compression, and generates records. The I-CSCF comprises is a SIP forwarding point that remote servers can find and signal. The i-CSCF queries the HSS to retrieve the address of the S-CSCF and assign it to a user performing SIP registration. The I-CSCF forwards SIP messages to the S-CSCF. The S-CSCF comprises a SIP server that controls user sessions. The S-CSCF interacts with the HSS to obtain user profiles and store user/S-CSCF pairings. The S-CSCF handles SIP registrations to bind the UE IP address to the user SIP address. The S-CSCF inspects signaling and forwards SIP messages to application servers like voice calling servers and video calling servers. The voice calling server interfaces with the S-CSCF to establish voice conferences by distributing UE IP addresses for voice streaming between UEs. The video calling server interfaces with the S-CSCF to establish video conferences by distributing UE IP addresses for video streaming between UEs.

In LTE/5G network core 314, user authorization server 330 comprises portions of circuitry 611-614 that store and execute an operating system, virtual layer, MME, HSS, AMP, AUSF, and UDM. Media conferencing server 330 comprises portions of circuitry 611-614 that store and execute an operating system, virtual layer, P-CSCF S-CSCF, voice calling server, and video calling server.

To register LTE/5GNR UE 301 for LTE service, UE 301 attaches to LTE/5GNR access point 310 and transfers an initial NAS message to the MME. The initial NAS message indicates UE information for UE 301 like IMSI, IMEI, IMPU, IMPI, and PLMN. The MME transfers the IMSI and PLMN for UE 301 to the HSS. The HSS shares a secret key with UE 301. The HSS uses the shared secret key and a RandomNumber (RAND) to generate an authentication vector for UE 301 that comprises a Key Access Security Management Entry (K-ASME), Authentication Token (AUTN) X-RES, and the RAND. The HSS returns the authentication vector to the MME.

The MME processes the K-ASME to generate a NAS Encryption Key (Ke), NAS Integrity Key (Ki), and eNodeB key (K-eNB). The MME transfers a NAS authentication request to UE 301 having RAND and AUTN. UE 301 generates an authentication result based on the shared secret key, AUTN, and RAND. UE 301 transfers a NAS authentication response having the authentication result to the MME. The MME matches the authentication result to the X-RES to authenticate UE 301.

The MME then transfers a NAS security command to UE 301 indicating encryption and integrity algorithms and a Key Selection Identifier Access Security Management Entry (KSI-ASME). UE 301 selects the K-ASME based on the KSI-ASME. UE 301 generates the Ke based on the K-ASME and the encryption algorithm. UE 301 generates the Ki based on the K-ASME and integrity algorithm. UE returns a NAS security response to the MME using the Ke and the Ki for a secure communication. In response to the secure communication, the MME transfers an S1-MME initiation message having the K-eNB to LTE/5GNR access point 310.

The RRC in LTE/5GNR access point 310 processes the K-eNB to generate RRC encryption and integrity keys. The RRC in LTE/5GNR access point 310 indicates the RRC encryption and integrity algorithms to UE 301. UE 301 uses the K-ASME and the encryption and integrity algorithms to generate the RRC encryption and integrity keys. UE 301 uses the RRC encryption and integrity keys to respond to the RRC LTE/5GNR access point 310 in a secure communication. In response to the secure communication, the RRC in LTE/5GNR access point 310 returns an S1-MME response to the MME indicating successful security establishment for UE 301.

In response to the successful security establishment, the MME transfers the X-RES and UE information like IMSI, IMEI, IMPU, and IMPI for UE 301 to the P-CSCF. The P-CSCF transfers the X-RES and the UE information for UE 301 to the I-CSCF which transfers an authentication request for UE 301 to the HSS. The HSS indicates the S-CSCF for UE 301 to the I-CSCF. The I-CSCF transfers the X-RES and UE information for UE 301 to the S-CSCF.

To register LTE/5GNR UE 301 for IMS services, UE 301 transfers a SIP registration message to the P-CSCF. The SIP Registration message has the authentication result and UP information like IMSI, IMEI, IMPU, and IMPI. The P-CSCF transfers the SIP Registration message to the I-CSCF, and the I-CSCF transfers an authentication request for UE 301 to the HSS. The HSS indicates the S-CSCF for UP 301 to the I-CSCF, and the I-CSCF transfers the SIP Registration message to the S-CSCF.

The S-CSCF matches the authentication result from UE 301 with the X-RES from the MME to register UE 301 for IMS service. The S-CSCF transfers a SIP OK message for UE 301 to the I-CSCF. The I-CSCF transfers the SIP OK message to the P-CSCF which transfers the SIP OK message to UE 301 to complete IMS registration. After successful IMS registration, the S-CSCF exchanges SIP signaling with UE 301 and other UEs to establish media conferences by signaling the PCRF over the P-CSCF. The PCRF signals the P-GW which signals the S-GW which signals the MME. The MME directs LTE/5GNR access point 310, S-GW, and P-GW to exchange media data for the media conferences.

Advantageously, LTE/5GNR network core 314 registers UE 301 for media conferencing with minimized access to the HSS and S-CSCF.

Figure 7:
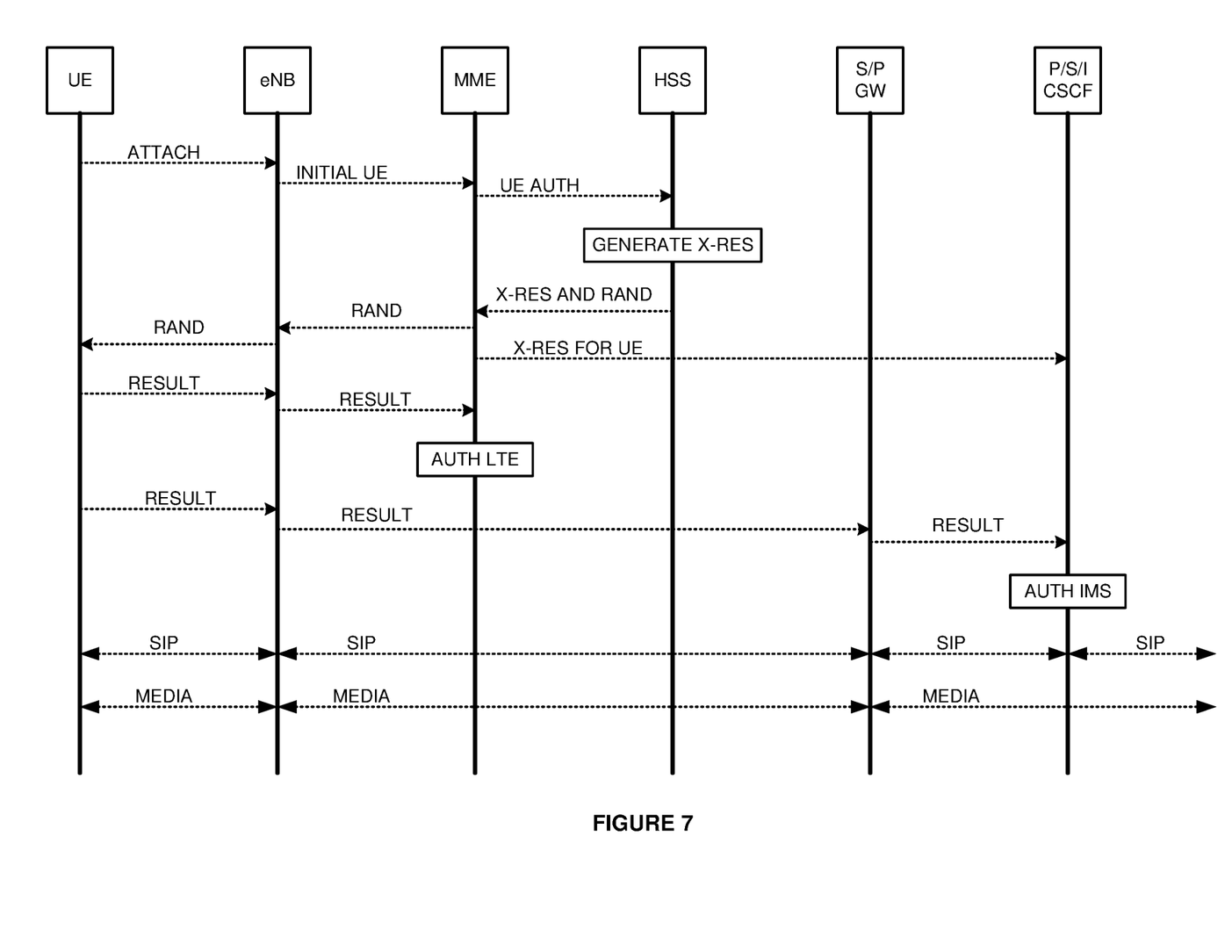
FIG. 7 illustrates the operation of a wireless communication system to serve a UE with media conferencing over an LTE network.

FIG. 7 illustrates the operation of a wireless communication system to serve a UE with media conferencing over an LTE network. The UE performs wireless Radio Resource Control (RRC) attachment to an LTE eNodeB (eNB). In response, the LTE eNodeB transfers an S1-MME initial UE message to an MME. The attachment signaling and the initial UE message include UE information like IMSI, IMEI, IMPU, and IMPI. The MME transfers an authorization request (UE AUTH) for the UE to the HSS. The HSS generates an Expected Result (X-RES) based on a shared secret key for the UE and a Random Number (RAND). The HSS transfers the RAND and the X-RES to the MME. The MME transfers the RAND to the UE over the eNodeB. The MME transfers the X-RES and UE information like the IMPU, IMPI, IMSI, and IMEI to the S-CSCF. In some examples, the MME transfers the X-RES and the UE information to the S-CSCF in response to a voice or video calling service identified by the HSS along with the X-RES and RAND.

The UE processes the RAND and the shared secret key to generate an authentication result. The UE transfers the authentication result to the eNodeB. The eNodeB transfers the authentication result to the MME. The MME matches the authentication result from the UE to the X-RES from the HSS to authorize the UE for LTE network service that includes an IMS signaling link. In response to LTE authorization, the UE transfers an IMS registration having the authentication result and UE information like IMPU, IMPI, IMSI, and IMEI to the eNodeB. The eNodeB transfers the IMS registration to the S-GW. The S-GW transfers the IMS registration result the P-GW, and the P-GW transfers the IMS registration result to the P-CSCF. The P-CSCF forwards the IMS registration result to the S-CSCF over the I-CSCF. The S-CSCF matches the authentication result from the UE to the X-RES from the MME to register the UE for IMS service. The UE and the S-CSCF then exchange SIP signaling over the eNodeB, S-GW, and P-GW to establish media sessions. The UE exchanges media data like voice and video over the eNodeB, S-GW, and P-GW for the media sessions.

Figure 8:
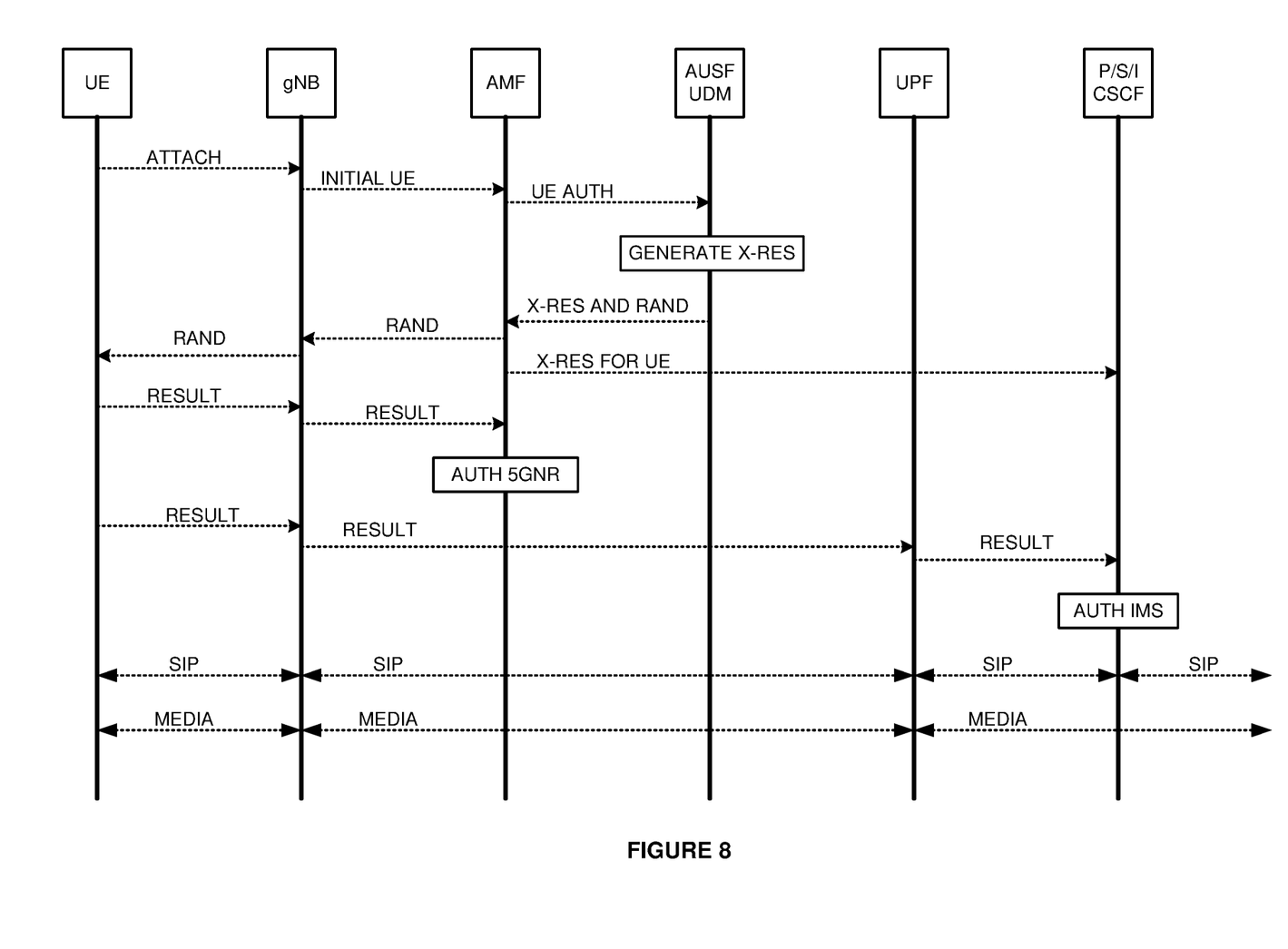
FIG. 8 illustrates the operation of a wireless communication system to serve a UE with media conferencing over a 5GNR network.

FIG. 8 illustrates the operation of a wireless communication system to serve a UE with media conferencing over an 5GNR network. The UE performs wireless Radio Resource Control (RRC) attachment to a 5GNR gNodeB (gNB). In response, the 5GNR gNodeB transfers an N2 initial UE message to an AMF. The attachment signaling and the initial N2 message include UE information like IMSI, IMEI, IMPU, and IMPI. The AMF transfers an authorization request (UE AUTH) for the UE to the AUSF. The AUSF or UDM generate an Expected Result (X-RES) based on a shared secret key for the UE and a Random Number (RAND). The AUSF transfers the RAND and the X-RES to the AMF. The AMF transfers the RAND to the UE over the gNodeB. The AMF transfers the X-RES and UE information like the IMPU, IMPI, IMSI, and IMEI to the S-CSCF. In some examples, the AMF transfers the X-RES and the UE information to the S-CSCF in response to a voice or video calling service identified by the AUSF/UDM along with the X-RES and RAND.

The UE processes the RAND and the shared secret key to generate an authentication result. The UE transfers the authentication result to the gNodeB. The gNodeB transfers the authentication result to the AMF. The AMF matches the authentication result from the UE to the X-RES from the AUSF to authorize the UE for 5GNR network service including an IMS signaling link. In response to the 5GNR authorization, the AMF transfers the X-RES and UE information like the IMPU, IMPI, IMSI, and IMEI to the S-CSCF. In response to 5GNR authorization, the UE transfers an IMS registration having the authentication result and UE information like IMPU, IMPI, IMSI, and IMEI to the gNodeB. The gNodeB transfers the IMS registration to the UPF. The UPF transfers the IMS registration to the P-CSCF. The P-CSCF transfers the IMS registration to the S-CSCF over the I-CSCF. The S-CSCF matches the authentication result from the UE to the X-RES from the AMF to register the UE for IMS service. The UE and the S-CSCF then exchange SIP signaling over the gNodeB and UPF to establish media sessions. The UE exchanges media data like voice and video over the gNodeB and UPF for the media sessions.

The wireless data network circuitry described above comprises computer hardware and software that form special-purpose network elements that serve users with more efficient media conferencing. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network elements that serve users with more efficient media conferencing.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention.

Thus, the invention is not limited to the specific embodiments described above, but only by the following claims and their equivalents.

What is claimed is:

1. A method of operating a wireless communication system to serve media conferencing to User Equipment (UE) that stores a secret key, the method comprising:
a wireless network core transferring UE information to a user authorization server that stores the secret key;
the user authorization server generating an expected result based on a random number and the secret key in response to the UE information and transferring the expected result and the random number to the wireless network core;
to authenticate the UE for wireless network service, the wireless network core transferring the random number to the UE, receiving an authentication result from the UE, and authenticating the UE by matching the authentication result to the expected result;
in response to the wireless network authentication, the wireless network core transferring the expected result received from the user authorization server to a media conferencing server without a request from the media conferencing server and establishing a signaling link between the UE and the media conferencing server;
to authenticate the UE for media conferencing service, the media conferencing server receiving the authentication result from the UE over the signaling link, registering the UE by matching the authentication result to the expected result received from the wireless network core, and establishing media conferences for the UE based on the media-conferencing registration; and
the wireless network core exchanging media conferencing data for the UE.

2. The method of claim 1 wherein the wireless network comprises a Long Term Evolution (LTE) network.

3. The method of claim 1 wherein the wireless network comprises a Fifth Generation New Radio (5GNR) network.

4. The method of claim 1 wherein the media conferencing server comprises an Internet Protocol Multimedia Subsystem (IMS).

5. The method of claim 1 wherein the wireless network comprises a Long Term Evolution (LTE) network and a Fifth Generation New Radio (5GNR) network and the media conferencing server comprises an Internet Protocol Multimedia Subsystem (IMS).

6. The method of claim 1 wherein the user authorization server comprises a Home Subscriber System (HSS).

7. The method of claim 1 wherein the user authorization server comprises an Authentication Server Function (AUSF).

8. The method of claim 1 wherein the user authorization server comprises a Unified Data Manager (UDM).

9. The method of claim 1 wherein the wireless network comprises a Mobility Management Entity (MME).

10. The method of claim 1 wherein the wireless network comprises an Access and Mobility Management Function (AMF).

11. A wireless communication system to serve media conferencing to User Equipment (UE) that stores a secret key, the system comprising:
a wireless network core configured to transfer UE information to a user authorization server that stores the secret key;
the user authorization server configured to generate an expected result based on a random number and the secret key in response to the UE information and transfer the expected result and the random number to the wireless network core;
the wireless network core configured to transfer the random number to the UE, receive an authentication result from the UE, and authenticate the UE for wireless network service by matching the authentication result to the expected result;
the wireless network core further configured to, in response to the wireless network authentication, transfer the expected result received from the user authorization server to a media conferencing server without a request from the media conferencing server and establish a signaling link between the UE and the media conferencing server;
the media conferencing server configured to receive the authentication result from the UE over the signaling link, register the UE by matching the authentication result to the expected result received from the wireless network core to authenticate the UE for media conferencing service, and establish media conferences for the UE based on the registration; and
the wireless network core configured to exchange media conferencing data for the UE.

12. The wireless communication system of claim 11 wherein the wireless network comprises a Long Term Evolution (LTE) network.

13. The wireless communication system of claim 11 wherein the wireless network comprises a Fifth Generation New Radio (5GNR) network.

14. The wireless communication system of claim 11 wherein the media conferencing server comprises an Internet Protocol Multimedia Subsystem (IMS).

15. The wireless communication system of claim 11 wherein the wireless network comprises a Long Term Evolution (LTE) network and a Fifth Generation New Radio (5GNR) network and the media conferencing server comprises an Internet Protocol Multimedia Subsystem (IMS).

16. The wireless communication system of claim 11 wherein the user authorization server comprises a Home Subscriber System (HSS).

17. The wireless communication system of claim 11 wherein the user authorization server comprises an Authentication Server Function (AUSF).

18. The wireless communication system of claim 11 wherein the user authorization server comprises a Unified Data Manager (UDM).

19. The wireless communication system of claim 11 wherein the wireless network comprises a Mobility Management Entity (MME).

20. The wireless communication system of claim 11 wherein the wireless network comprises an Access and Mobility Management Function (AMF).

* * * * *